United States Patent
Yu et al.

(10) Patent No.: US 11,093,225 B2
(45) Date of Patent: Aug. 17, 2021

(54) HIGH PARALLELISM COMPUTING SYSTEM AND INSTRUCTION SCHEDULING METHOD THEREOF

(71) Applicant: Xilinx, Inc., San Jose, CA (US)

(72) Inventors: Qian Yu, Beijing (CN); Lingzhi Sui, Beijing (CN); Shaoxia Fang, Beijing (CN); Junbin Wang, Beijing (CN); Yi Shan, Beijing (CN)

(73) Assignee: Xilinx, Inc., San Jose, CA (US)

( * ) Notice: Subject to any disclaimer, the term of this patent is extended or adjusted under 35 U.S.C. 154(b) by 204 days.

(21) Appl. No.: 16/454,103

(22) Filed: Jun. 27, 2019

(65) Prior Publication Data

US 2020/0004514 A1  Jan. 2, 2020

(30) Foreign Application Priority Data

Jun. 28, 2018 (CN) .......................... 201810690479.4
Jun. 29, 2018 (CN) .......................... 201810715278.5

(51) Int. Cl.
  *G06F 8/41* (2018.01)
  *G06F 9/30* (2018.01)
  (Continued)

(52) U.S. Cl.
  CPC .......... *G06F 8/433* (2013.01); *G06F 9/30043* (2013.01); *G06F 9/30123* (2013.01);
  (Continued)

(58) Field of Classification Search
  CPC .. G06F 8/433; G06F 9/30043; G06F 9/30123; G06F 9/30145; G06F 9/3838; G06F 9/544; G06N 3/08
  See application file for complete search history.

(56) References Cited

U.S. PATENT DOCUMENTS

| | | | | |
|---|---|---|---|---|
| 6,016,540 A | * | 1/2000 | Zaidi | G06F 9/3836 712/205 |
| 6,557,095 B1 | * | 4/2003 | Henstrom | G06F 9/3836 712/207 |

(Continued)

FOREIGN PATENT DOCUMENTS

| | | |
|---|---|---|
| CN | 106227507 A | 12/2016 |
| CN | 105117286 B | 6/2018 |

OTHER PUBLICATIONS

Patterson, Jason Robert Carey. "Basic Instruction Scheduling (and Software Pipelining)." Lighterra, Sep. 2003, www.lighterra.com/papers/basicinstructionscheduling/. Accessed Mar. 25, 2021. (Year: 2003).*

*Primary Examiner* — Wei Y Zhen
*Assistant Examiner* — Binh Luu

(57) ABSTRACT

A high parallelism computing system and instruction scheduling method thereof are disclosed. The computing system comprises: an instruction reading and distribution module for reading a plurality of types of instructions in a specific order, and distributing the acquired instructions to corresponding function modules according to the types; an internal buffer for buffering data and instructions for performing computation; a plurality of function modules each of which sequentially executes instructions of the present type distributed by the instruction reading and distribution module and reads the data from the internal buffer; and wherein the specific order is obtained by topologically sorting the instructions according to a directed acyclic graph consisting of the types and dependency relationships. By reading the instructions based on the topological sorting the directed acyclic graph constructed according to the types and dependency relationships, the deadlock caused by the instruction dependencies can be avoided by a relatively simple operation.

21 Claims, 6 Drawing Sheets

(51) Int. Cl.
  *G06F 9/54* (2006.01)
  *G06F 9/38* (2018.01)
  *G06N 3/08* (2006.01)

(52) U.S. Cl.
  CPC ........ *G06F 9/30145* (2013.01); *G06F 9/3838* (2013.01); *G06F 9/544* (2013.01); *G06N 3/08* (2013.01)

(56) References Cited

U.S. PATENT DOCUMENTS

| | | | | |
|---|---|---|---|---|
| 7,840,914 | B1* | 11/2010 | Agarwal | G06F 8/451 |
| | | | | 716/102 |
| 8,316,355 | B2* | 11/2012 | Feng | G06F 8/456 |
| | | | | 717/135 |
| 2002/0144101 | A1* | 10/2002 | Wang | G06F 9/3808 |
| | | | | 712/240 |
| 2005/0216900 | A1* | 9/2005 | Shi | G06F 9/45516 |
| | | | | 717/161 |
| 2009/0031290 | A1* | 1/2009 | Feng | G06F 8/456 |
| | | | | 717/126 |
| 2009/0171731 | A1* | 7/2009 | Bobak | G06Q 10/06 |
| | | | | 705/7.23 |
| 2009/0172668 | A1* | 7/2009 | Bobak | G06F 11/16 |
| | | | | 718/100 |
| 2009/0172689 | A1* | 7/2009 | Bobak | G06F 9/5061 |
| | | | | 718/104 |
| 2014/0181476 | A1* | 6/2014 | Srinivasan | G06F 9/3838 |
| | | | | 712/208 |
| 2015/0268992 | A1* | 9/2015 | Fan | G06F 9/4881 |
| | | | | 718/106 |
| 2020/0073987 | A1* | 3/2020 | Perumala | G06F 16/2471 |

\* cited by examiner

Fig.3
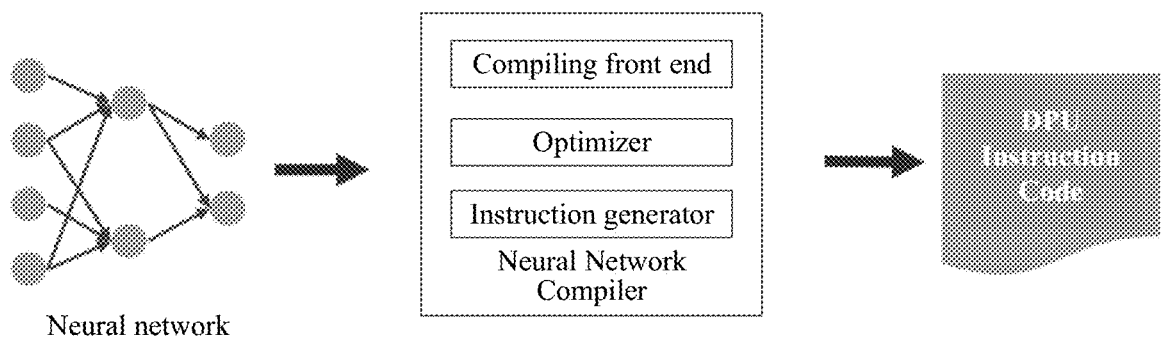
Fig.4
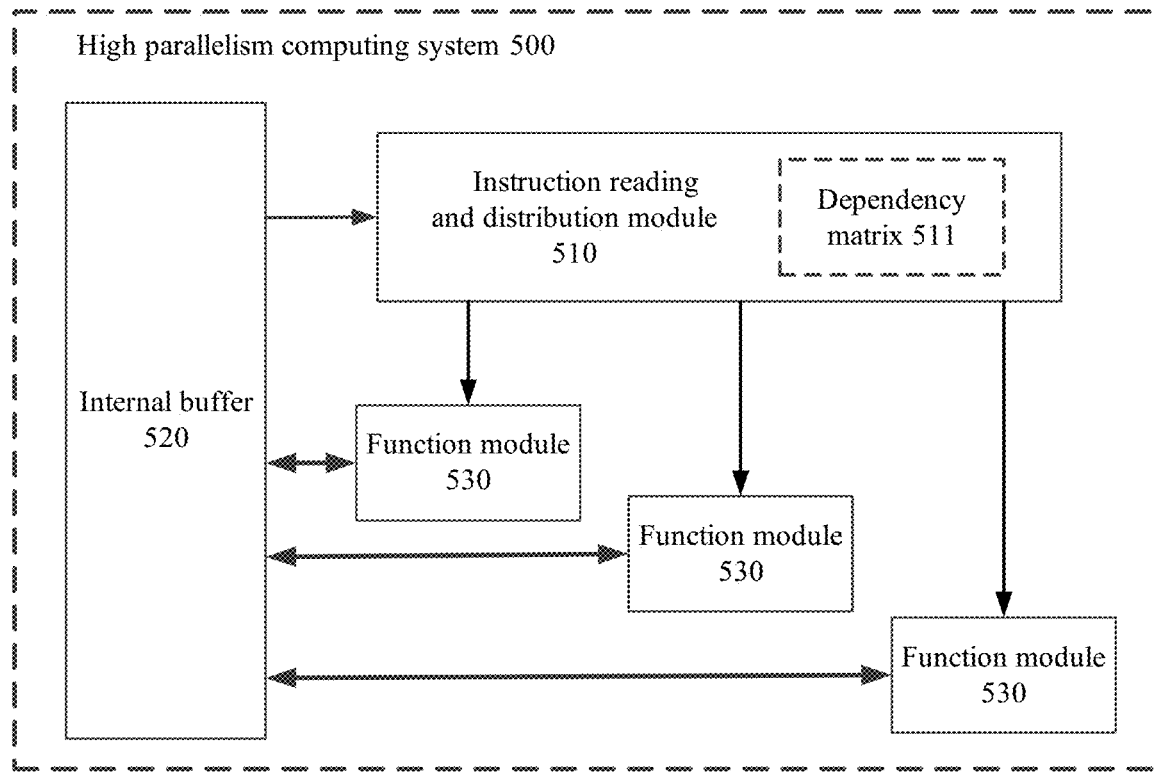
Fig.5

HIGH PARALLELISM COMPUTING SYSTEM AND INSTRUCTION SCHEDULING METHOD THEREOF

TECHNICAL FIELD

The present disclosure relates to the field of high parallelism computation, and more particularly to a high parallelism computing system and instruction scheduling method thereof and a corresponding compilation method.

TECHNICAL BACKGROUND

Neural networks have become a research hotspot in the field of image recognition in recent years. The trained neural network models can be used in many fields such as image classification, object recognition and significant detection. In recent years, the neural network models have shown a trend of increasing computing scale and increasing complexity. With the traditional CPU platforms, it has been unable to meet their practical demands. Therefore, the use of heterogeneous computing platforms such as FPGAs, GPUs, or ASICs for neural network accelerator designs has become a new research hotspot. Among them, FPGAs and ASICs can achieve more flexible hardware architecture and higher computational energy efficiency ratio than the GPU platform, which more adapts to the requirements of high-speed development of the algorithms.

When computing is performed using such heterogeneous computing platforms, the execution time of parallel computing is very short compared with the time cost required for performing data access with an external memory. Therefore, how to make full use of the parallel execution capability of each module in the computing platform to improve the system computing efficiency becomes an important issue to be considered in these heterogeneous computing platforms.

Therefore, there is still a need for a related scheme that can optimize high parallelism computation.

SUMMARY

In order to solve at least one of the above problems, the present disclosure proposes a high parallelism computing system and instruction scheduling method thereof, and a corresponding instruction compiling method. The technical solution of the present disclosure determines a reasonable instruction execution order by constructing a directed acyclic graph (DAG) including the execution and dependency of various types of instructions, and realizes reasonable distribution of read instructions by simply maintaining several dependency distances.

According to an aspect of the present disclosure, there is proposed a high parallelism computing system, comprising: an instruction reading and distribution module for reading a plurality of types of instructions in a specific order, and distributing the acquired instructions to corresponding function modules according to the types; an internal buffer for buffering data and instructions for performing computation; a plurality of function modules each of which sequentially executes instructions of the present type distributed by the instruction reading and distribution module and reads the data from the internal buffer; and wherein the specific order is obtained by topologically sorting the instructions according to a directed acyclic graph consisting of the types and dependency relationships. Thus, based on the topological sorting of the directed acyclic graph constructed according to the types and dependency relationships of the instructions, the deadlock caused by the instruction dependencies can be avoided by a relatively simple operation. Preferably, the above-mentioned sorting may be implemented during an instruction compiling phase, thereby further reducing the resource consumption of the computing system itself.

The directed acyclic graph may be simplified by the seriality of instructions of the same type. For example, dependencies of a certain instruction on two or more instructions of another type is simplified into a direct dependency on the last instruction in the two or more instructions of the another type, and dependencies of two or more instructions of a same type on a certain instruction of another type is simplified into a direct dependency of the earliest instruction in the two or more instructions of the same type on the certain instruction of the another type, and a direct dependency of a subsequent instruction in the two or more instructions of the same type on a previous instruction. Thus, it is further convenient to topologically sort the directed acyclic graph.

Preferably, the instruction reading and distribution module may distribute corresponding instructions to the plurality of function modules in the specific order of reading the instructions.

Preferably, the instruction reading and distribution module may further include a dependency matrix including a plurality of indicators each for indicating whether each type of instructions depend on a certain other type of instructions, and at least when the indicators indicate that a certain type of instructions do not depend on all other types of instructions, distribute corresponding instructions to a function module for executing the certain type of instructions. The plurality of indicators may be a plurality of counters, wherein each counter indicates the number of dependencies that a certain type of instructions to another type of instructions. Correspondingly, the instruction reading and distribution module further includes a first in first out queue (FIFO) for buffering the read instructions.

The instructions read by the instruction reading and distribution module may include explicit dependency relationships of the instructions with other instructions, and the instruction reading and distribution module updates a value of each counter in the dependency matrix according to the explicit dependency relationships and distribution of the instructions.

Further, the instruction reading and distribution module distributes instructions to be distributed directly based on indications of corresponding indicators and indications of the corresponding function modules completing previous instructions without receiving end-of-execution indications of instructions of other types on which the instructions to be distributed depend.

Specifically, the plurality of function modules may include: a data loading engine for a data loading instruction that loads data for performing computation from an external memory to an internal buffer; a data operation engine for a data operation instruction that reads the data from the internal buffer to perform an operation and stores the operational result back to the internal buffer; and a data storage engine for a data storage instruction that stores the operational result from the internal buffer back to the external memory. Corresponding, the dependency matrix may include at least the following indicators: a first indicator for indicating that the data loading instruction depends on the data storage instruction; a second indicator for indicating that the data operation instruction depends on the data loading instruction; and a third indicator for indicating that the data storage instruction depends on the data operation instruction.

Then, the instruction reading and distribution module distributes a next data loading instruction to the data loading engine, based on an end flag of the data loading engine executing a current data loading instruction and an indication of the first indicator that the data loading instruction does not depend on the data storage instruction; and/or distributes a next data operation instruction to the data operation engine based on an end flag of the data operation engine executing a current data operation instruction and an indication of the second indicator that the data operation instruction does not depend on the data loading instruction; and/or the instruction reading and distribution module distributes a next data storage instruction to the data storage engine based on an end flag of the data storage engine executing a current data storage instruction and an indication of the third indicator that the data storage instruction does not depend on the data operation instruction.

The high parallelism computing system may be a neural network computing system and the data for performing computation buffered in the internal buffer is feature map data and parameter data for performing neural network computation. Preferably, the computing system is implemented at least in part by a GPU, an FPGA or an ASIC.

Preferably, a first function module executes a current instruction; and based on at least parameter information of the current instruction and dependency information of a subsequent instruction directly depending on the current instruction, a second function module starts the execution of the subsequent instruction before the execution of the current instruction is completed.

Preferably, the instruction reading and distribution module may be further used for: based on at least type information of the current instruction and the subsequent instruction, dividing the execution of the current instruction into two phases of dependency and no dependency; generating an end flag of the current instruction directly when the dependency phase has been completed; and based on at least the end flag of the current instruction, using the second function module to execute the subsequent instruction.

Preferably, the instruction reading and distribution module may be further used for: based on at least the parameter information and the dependency information, dividing the execution of the current instruction into a plurality of phases; generating a phase end flag when at least one phase of the plurality of phases has been completed; and based on at least the phase end flag, using the second function module to execute the subsequent instruction.

Preferably, the instruction reading and distribution module may be further used for: based on the data obtained from the at least one phase that has been completed, using the second function module to execute the subsequent instruction.

A granularity size of the plurality of phases divided is determined by the instruction reading and distribution module based on at least a granularity size of instructions for performing neural network computation and parameters of the computing system for performing neural network computation.

Preferably, the plurality of function modules may include: a data loading engine executing a data loading instruction that loads data for neural network computation from an external memory to an internal buffer, the data for neural network computation including parameter data and feature map data; a data operation engine executing a data operation instruction that reads the parameter data and the feature map data from the internal buffer to perform an operation and stores the operational result back to the internal buffer; and a data storage engine executing a data storage instruction that stores the operational result from the internal buffer back to the external memory.

Preferably, the first function module may be a data loading engine, the second function module may be a data operation engine, and in response to the data loading engine completing loading of weight and feature map data of at least one complete operation unit, the data operation engine starts the execution of the data operation instruction.

Preferably, the first function module may be a data operation engine, the second function module may be a data storage engine, and in response to the data operation engine generating at least one operational final result and buffering the at least one operational final result to the internal buffer, the data storage engine starts the execution of the data storage instruction to store the at least one operational final result from the internal buffer back to the external memory.

Preferably, the first function module may be a data storage engine, the second function module may be a data loading engine, and in response to output feature map data that the data storage engine stores back to the external memory having no dependency relationships with input feature map data to be loaded from the external memory by the data loading instruction directly depending on the current data storage instruction, the data loading module is configured to start the execution of the data loading instruction after the output feature map data is written into a bus buffer zone.

The instructions for performing neural network computation may include explicit dependency relationship information of the instructions with other instructions, and the instruction reading and distribution module uses explicit dependency relationship information in the current instruction as dependency information for the subsequent instruction directly depending on the current instruction.

According to another aspect of the present disclosure, there is proposed a high parallelism instruction scheduling method, comprising: reading a plurality of types of instructions in a specific order, the specific order being obtained by topologically sorting the instructions according to a directed acyclic graph consisting of the types and dependency relationships; distributing the read instructions of the plurality of types to corresponding function modules according to the types; and a plurality of function modules sequentially executing instructions of a present type acquired by distribution.

In an embodiment, the instruction scheduling method may further comprise: constructing a dependency matrix based on the dependency relationships of the instructions, the dependency matrix including a plurality of indicators each for indicating whether each type of instructions depend on a certain other type of instructions. Correspondingly, the instruction distribution step may comprise: at least when the indicators indicate that a certain type of instructions do not depend on all other types of instructions, distributing corresponding instructions to a function module for executing the certain type of instructions.

The plurality of indicators may be a plurality of counters, wherein each counter indicates the number of dependencies that a certain type of instructions to another type of instructions. Thus, the instruction scheduling method may further comprise: acquiring explicit dependency relationships of the instructions with other instructions included in the read instructions, and constructing the dependency matrix based on the dependency relationships of the instructions may comprise: updating a value of each counter in the dependency matrix according to the explicit dependency relationships and the distribution of instructions. Thus, the instruction distribution step may comprise: distributing corresponding instructions to the function module for executing the certain type of instructions directly based on indications of corresponding indicators and indications of the corresponding function modules completing previous instructions without receiving end-of-execution indications of instructions of other types on which the instructions to be distributed depend.

Specifically, the acquired instructions of the plurality of types include: a data loading instruction that loads data for performing computation from an external memory to an internal buffer; a data operation instruction that reads the data from the internal buffer to perform an operation and stores the operational result back to the internal buffer; and a data storage instruction that stores the operational result from the internal buffer back to the external memory. Therefore, the corresponding function modules may include: a data loading engine; a data operation engine; and a data storage engine. The dependency matrix includes at least the following indicators: a first indicator for indicating that the data loading instruction depends on the data storage instruction; a second indicator for indicating that the data operation instruction depends on the data loading instruction; and a third indicator for indicating that the data storage instruction depends on the data operation instruction.

Correspondingly, distributing the corresponding instructions to the function module for executing the certain type of instructions directly based on the indications of the corresponding indicators and the indications of the corresponding function modules completing previous instructions without receiving the end-of-execution indications of instructions of other types on which the instructions to be distributed depend may comprise: distributing a next data loading instruction to the data loading engine, based on an end flag of the data loading engine executing a current data loading instruction and an indication of the first indicator that the data loading instruction does not depend on the data storage instruction; and/or distributing a next data operation instruction to the data operation engine based on an end flag of the data operation engine executing a current data operation instruction and an indication of the second indicator that the data operation instruction does not depend on the data loading instruction; and/or distributing a next data storage instruction to the data storage engine based on an end flag of the data storage engine executing a current data storage instruction and an indication of the third indicator that the data storage instruction does not depend on the data operation instruction.

The specific order of the above-mentioned read instructions and/or the explicit dependency information carried by the instructions may be implemented by compilation before the instructions are fed to the computing system. Therefore, according to still another aspect of the present disclosure, there is proposed a neural network compiling method, comprising: acquiring a structure and parameters of a neural network; generating a directed acyclic graph of instructions for performing neural network computation according to types and dependency relationships based on the structure of the neural network; topologically sorting the directed acyclic graph to obtain instructions having a specific order; and generating binary instruction codes having the specific order for performing neural network computation by the computing system described above.

Preferably, generating the directed acyclic graph of the instructions for performing neural network computation according to the types and dependency relationships based on the structure of the neural network comprises: simplifying dependencies of a certain instruction on two or more instructions of another type into a direct dependency on the last instruction in the two or more instructions of the another type, and simplifying dependencies of two or more instructions of a same type on a certain instruction of another type into a direct dependency of the earliest instruction in the two or more instructions of the same type on the certain instruction of the another type, and a direct dependency of a subsequent instruction in the two or more instructions of the same type on a previous instruction, to obtain a simplified directed acyclic graph.

Preferably, generating binary instruction codes having the specific order for performing neural network computation by the computing system may further comprise: generating binary instruction codes that include an explicit dependency relationship of the current instruction with other instructions.

Preferably, a first function module may be configured to execute a current instruction; and based on at least parameter information of the current instruction and dependency information of a subsequent instruction directly depending on the current instruction, a second function module is configured to start the execution of the subsequent instruction before the execution of the current instruction is completed.

Thus, the execution start time of the subsequent instruction can be advanced, so that the overall instruction execution is more compact, thereby improving the overall computing efficiency of the system.

Specifically, based on at least type information of the current instruction and the subsequent instruction, the execution of the current instruction may be divided into two phases of dependency and no dependency; generating an end flag of the current instruction directly when the dependency phase has been completed; and based on at least the end flag of the current instruction, the second function module is configured to execute the subsequent instruction. Thus, the high parallelism instruction execution between the function modules in the computing system can be realized by timely issuing the end flag ahead of time.

Specifically, the execution of the current instruction may be divided into a plurality of phases based on at least the parameter information and the dependency information; a phase end flag is generated when at least one phase of the plurality of phases has been completed; and based on at least the phase end flag, the second function module is configured to execute the subsequent instruction. Thus, a finer-granularity dependency execution between dependency instructions can be implemented based on a finer-granularity division of instructions insider the computing system. A granularity size of the plurality of phases divided may be determined based on at least a granularity size of instructions for performing neural network computation and parameters of the computing system for performing neural network computation. Preferably, based on the data obtained from the at least one phase that has been completed, the second function module may be configured to execute the subsequent instruction.

The acquired instructions for performing neural network computation may include: a data loading instruction that loads data for neural network computation from an external memory to an internal buffer, the data for neural network computation including parameter data and feature map data; a data operation instruction that reads the parameter data and the feature map data from the internal buffer to perform an operation and stores the operational result back to the internal buffer; and a data storage instruction that stores the operational result from the internal buffer back to the external memory. The instruction scheduling method of the present disclosure is particularly applicable to neural network inference calculations mainly including the above-mentioned instruction types.

Specifically, a data loading engine may be configured to execute a current data loading instruction; and before acquiring indication information that the execution of the current data loading instruction is completed, in response to completing loading of weight and feature map data of at least one complete operation unit, a data operation engine is configured to start the execution of the data operation instruction.

Specifically, a data operation engine may be configured to execute a current data operation instruction; and before acquiring indication information that the execution of the current data operation instruction is completed, in response to generation of at least one operational final result, the at least one operational final result is buffered to the internal buffer, and a data storage engine is configured to start the execution of the data storage instruction to store the at least one operational final result from the internal buffer back to the external memory.

Specifically, a data storage engine may further be configured to execute a current data storage instruction; and in response to output feature map data that the data storage engine stores back to the external memory having no dependency relationships with input feature map data to be loaded from the external memory by the data loading instruction directly depending on the current data storage instruction, a data loading module is configured to start the execution of the data loading instruction after the output feature map data is written into a bus buffer zone.

The acquired instructions may include explicit dependency information of the instructions with other instructions, and the explicit dependency information in the current instruction is used as dependency information for the subsequent instruction directly depending on the current instruction.

Thus, the high parallelism computing system and instruction scheduling method thereof of the present disclosure can implement an order of fetching the instructions that avoids the deadlock caused by the instruction dependencies in a relatively simple manner by constructing a directed acyclic graph and performing topological sorting. Based on the above-mentioned order of fetching the instructions, and in combination with, for example, the dependencies explicitly indicated in the instructions, the instruction reading and distribution module can realize the reasonable distribution of the parallel execution instructions of each engine by simply maintaining the dependency matrix, thereby improving the parallelism between the engines in the computing system. Further, the above-mentioned fetching order and explicit dependencies can be implemented by compiling before the instruction is fed to the computing system, thereby further reducing the resource consumption of the computing system itself.

BRIEF DESCRIPTION OF THE DRAWINGS

FIG. 3 shows an example of a convolution operation.
FIG. 4 shows a compilation schematic diagram of an existing neural network compiler.
FIG. 5 shows a composition schematic diagram of a high parallelism computing system according to an embodiment of the present disclosure.

DETAILED DESCRIPTION

Artificial intelligence has been rapidly developed in recent years, and has achieved good application effects in the fields such as image classification, detection, and video and voice processing, and still has great development prospects. Neural networks are the core of artificial intelligence application, and deep learning neural network algorithms are the most common neural network models. The workload characteristics of the neural networks are computationally and data intensive. Multiplication and addition operations for the neural network computation are usually on the order of Giga. For example, the computation amount of a target detection type neural network SSD is operation times of 120 G. Meanwhile, parameters for the computation are usually on the order of M bytes to hundreds of M bytes. For example, the parameters of a classification neural network VGG are 480 Mbytes.

Common artificial neural networks (ANNs) include deep neural networks (DNN), recurrent neural network (RNN), and convolutional neural networks (CNN). Background is described below to some extent by using CNN as an example.

Basic Concepts of CNN

Figure 1:
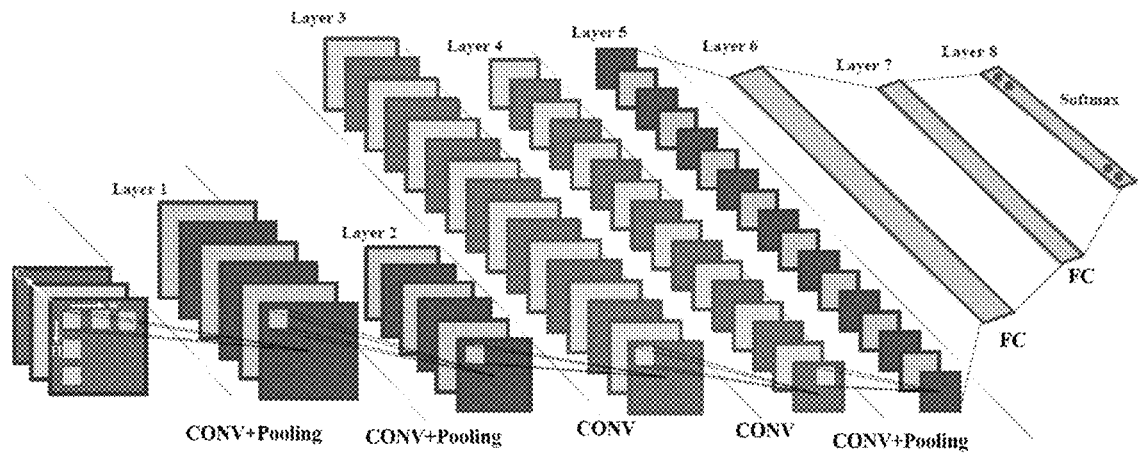
FIG. 1 shows a configuration example of a CNN.

As shown in FIG. 1, a CNN includes a series of layers that operate in order.

The CNN includes an input layer, an output layer and a plurality of hidden layers in series. The first layer of the CNN reads an input, such as an input image, and outputs a series of activation values (also referred to as feature maps). A lower layer reads activation values generated by an upper layer and outputs new activation values. The last classifier outputs the probability of each type to which the input image may belong.

These layers may be roughly divided into weighted layers (such as CONV layers, fully connected layers, batch normalization layers, etc.) and unweighted layers (such as pooled layers, ReLU layers, Softmax layers, etc.). A CONV layer (convolutional layer) takes a series of feature maps as an input and obtains output activation values by convoluting kernel convolution. A pooling layer is typically connected to the CONV layer for outputting the maximum or average value of each sub-area in each feature map, thereby reducing the computation amount by sub-sampling while maintaining some degree of displacement, scale and deformation invariance. A plurality of alternations between the convolutional layer and the pooling layer may be included in one CNN, thereby gradually reducing the spatial resolution and increasing the number of feature mappings. The CONV layers may also be directly connected without the pooling layer. It can then be connected to at least one fully connected layer (FC), and a one-dimensional vector output comprising a plurality of feature values is obtained by applying a linear transformation to an input feature vector.

In general, an operation of a weighted layer may be expressed as:

$$Y=WX+b,$$

where W is a weight value, b is a bias, X is an input activation value, and Y is an output activation value.

An operation of an unweighted layer may be expressed as:

$$Y=f(X),$$

where f(X) is a nonlinear function.

Herein, "weights" refer to parameters in a hidden layer. In the CNN network, the weights can be considered to be a convolution kernel, in which a size for each convolutional layer size may vary, and a value for each channel of each convolutional layer may also vary. In a broad sense, the weights can also include biases, and are numerical values learned through a training process, and remain unchanged during inference. In addition, the CNN may also include parameters for performing other operations, such as parameters for various operations for unweighted layers. The activation values refer to numerical values passed between layers, where starting from the input layer, the output of each layer is obtained by the operation of the input values and the weight values, also referred to as feature values. Unlike the parameter values, the distribution of activation values dynamically changes based on the input data samples.

As shown, each layer starting from the input feature map (input image) has a plurality of channels to characterize different features of the input image, before the feature values are fed to the FC layer. When the input is a color image, the initial input feature map usually has three channels of RGB, and feature values of different channels in the same layer are convoluted with convolution kernels with the same size but different values, respectively, to generate the output feature value of the layer. The feature value is then fed into the next CONV layer (Layer 1) where the number of channels and the size of the convolution kernels may be different, for further feature extraction. The above-mentioned process is repeated until the output of Layer 7 is fed into the FC layer. As shown in the figure, W, H, and C in the input feature map refer to three dimensions of width, height, and channel, respectively. The arrows may refer to a specific computing order or computational parallelism (especially in the case of computing on a high parallelism computing platform).

The first FC layer may be a fully connected layer for extracting features of each channel as a one-dimensional feature vector. The second FC layer may be a classifier for classification.

Operation of Convolutional Layer

Whether it is DNN, RNN or CNN, neural network models, especially neural network models for computer vision applications, include a plurality of CONV layers as shown in FIG. 1. For each CONV layer, a higher level of abstract data is extracted from the input feature map data to retain important and unique information in the input data. Modern DNNs can achieve superior visual performance by utilizing deep levels (e.g., hundreds of convolutional layers).

Figure 2:
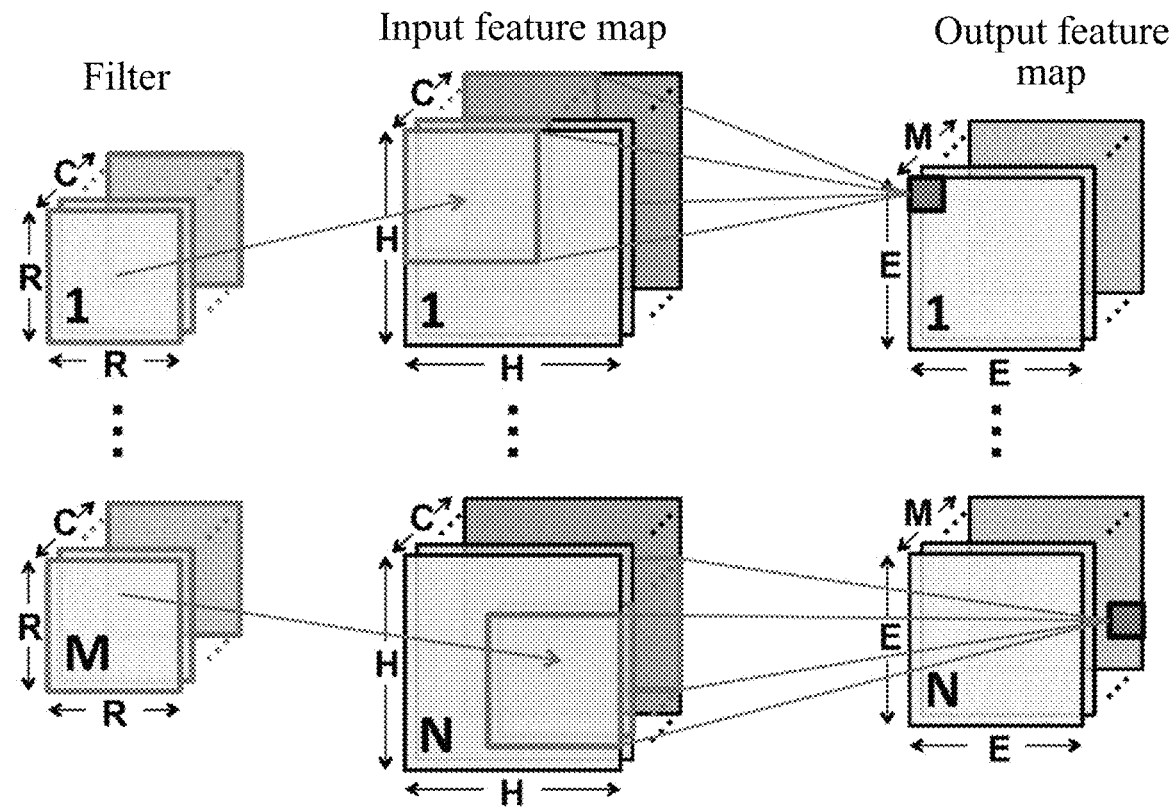
FIG. 2 shows an operation example of a convolutional layer in a neural network.

FIG. 2 shows an operation example of a convolutional layer in a neural network. The above-mentioned operation also applies to the fully connected layer, such as the FC layer shown in FIG. 1. The three-dimensional input of each convolutional layer is a two-dimensional feature map (W×H) with a plurality of channels (C). For a neural network that performs visual processing, its first input is typically a two-dimensional image with three color channels of RGB. A plurality of 3D filters (M filters with R×S×C dimensions, filters may also be referred to as convolution kernels) are then convoluted with the input feature map, and each filter can generate one channel of the output 3D feature map (a two-dimensional E×F feature map with M channels). The same set of M filters can be applied to a batch (B) with N input feature maps. Thus, the N input feature maps can acquire N output feature maps (herein, batch B may also be considered as the fourth dimension of the input). In addition, a one-dimensional bias can be applied to the filtered results (not shown in FIG. 2).

FIG. 3 shows an example of a convolution operation. This convolution operation can be seen as a convolution of a two-dimensional filter (R×S) with a two-dimensional feature map (W×H) on a certain channel C. As shown in FIG. 3, a 3×3 (R×S) convolution kernel is used to perform convolution calculations on a 5×5 (W×H) feature map with a stride of one. The left side of the figure shows the first convolution calculation, the middle shows the second convolution calculation, and so on. According to the definition of convolution calculations, each specific convolution calculation can be decomposed into multiple multiplication and addition calculations. After 9 convolution calculations, the convolved 3×3 feature map on the right side of FIG. 3 is obtained. Since there are no dependency relationships between the 9 convolution calculations, they can be done in a single operation when computing with a high parallelism computing platform (the parallelism M may typically be on the order of thousands). FIG. 3 can be considered as a convolution operation of one channel C in the plurality of channels of the CONV layer. After completing the convolution operation of all channels C and subsequent addition operations, a feature map of one channel in the M channels of the output three-dimensional feature map can be obtained. Further, the above-mentioned output three-dimensional feature map (two-dimensional E×F feature map with M channels) is only one of the N output three-dimensional feature maps in the batch.

Deployment of Neural Network

Before deploying CNN for inference (e.g., image classification), the CNN needs to be first trained. By importing a large amount of training data, the parameters such as weights and biases of each layer of the neural network model are determined.

In order to deploy the trained deep neural network, a compiler may be used to compile the neural network algorithm into a binary instruction stream that the computing platform can execute. Unlike applications developed using advanced languages such as C++ or Java, a neural network algorithm has its own unique syntax and structure. In view of this, high performance computing platforms dedicated to neural network computing and corresponding neural network compilers have been developed. For example, a deep neural network compiler (DNNC) can compile a neural network algorithm into an optimized instruction stream of a deep learning processor unit (DPU) platform. By analyzing the topology of the neural network to construct an intermediate representation (IR) of a compiler internal calculation diagram equivalent thereto, and a control flow and data flow information in the IR, the neural network compiler applies various compilation optimization and transformation techniques based on the IR, and the system memory bandwidth and power consumption requirements are effectively reduced while improving the computing performance of DPU. FIG. 4 shows a compilation schematic diagram of an existing neural network compiler. As shown in FIG. 4, a specialized neural network algorithm (for example, for a pruned CNN) may be fed into a neural network compiler including a compiling front end, an optimizer, and an instruction generator, and binary instruction codes for a neural network computing platform (e.g., DPU) are generated.

Herein, "compiling" refers to a process of generating low-level object codes for execution on a computing platform from a representation described in an advanced formalization method by using a compiler. Since a hardware computing platform handles only binary instruction codes, a compiler may be used to convert advanced language descriptions familiar to us into computer-readable low-level binary codes. Unlike source codes described in advanced programming languages such as C/C++, neural networks need to be represented by specialized models that describe neural network algorithms. A neural network algorithm includes the topology of the neural network algorithm and the parameters of the neural network algorithm. In contrast, the storage space used by the formalization description of the topology of the neural network is much smaller than that used by massive parameters of a neural network algorithm.

Herein, a neural network computing system may refer to a hardware platform dedicated to performing neural network inference calculations, which may also be referred to as a neural network computing platform, and may be implemented as a neural network specialized processor, such as the DPU described above.

High Parallelism Computing System

According to the concept of instructions and data streams, the computer architecture can be divided into four basic types, namely, a single instruction single data stream, a single instruction multiple data stream, a multiple instruction single data stream, and a multiple instruction multiple data stream. The single instruction single data stream type is a traditional architecture whose hardware does not support any form of parallel computing and in which all instructions are serially executed. Most of early computers used this type of architecture. The single instruction multiple data stream architecture is often used in the fields such as digital signal processing, image processing, and multimedia information processing, and one instruction corresponds to multiple parallel data processing units. The multiple instruction single data stream architecture has no practical application, because the computing systems adopting multiple instruction architectures often have multiple parallel data streams. Thus, the multiple instruction multiple data stream architecture is more widely used.

In a complex high parallelism computing system, it is often composed of multiple function modules (engines) with different functions but having certain dependency relationships. A module that schedules these engines is responsible for reading and distribution of instructions, and one main task of the instruction reading and distribution module is to distribute the instructions to corresponding engines when the dependency relationships are satisfied. Herein, high parallelism refers to the instruction execution of each engine is highly parallel. FIG. 5 shows a composition schematic diagram of a high parallelism computing system according to an embodiment. In the figure, a thin solid line indicates an instruction path, and a thick solid line indicates a data path.

In a neural network inference application, because it involves a large amount of unrelated calculations (a large amount of multiplication and addition calculations that can be performed simultaneously, as described above with reference to FIGS. 2 and 3), and uses multiple interdependent acceleration engines to work together, the multi-instruction multi-stream architecture described above is often employed, for example, the computing system architecture shown in FIG. 5. However, it should be understood that the architecture of FIG. 5 is also applicable to other scenarios where various instructions are executed in parallel by respective engines.

As shown in the figure, a high parallelism computing system 500 can include an instruction reading and distribution module 510, an internal buffer 520 and a plurality of function modules 530.

The instruction reading and distribution module 510 may be used for reading a plurality of types of instructions in a specific order, and distributing the acquired instructions to corresponding function modules according to the types. In another embodiment, the instruction reading and the instruction distribution may also be separate modules.

The internal buffer 520 may be used for buffering data and instructions for performing computation. The plurality of function modules 530 each sequentially execute the instructions of the present type distributed by the instruction reading and distribution module 510 and reads the data for executing the instructions from the internal buffer. The plurality of function modules can each perform parallel instruction execution, only if the dependency relationships between the instructions of different types can be satisfied. The word "plurality" in the plurality of function modules refers to two or more. Although three function modules are shown in the figure, it should be understood that the computing system 500 may have more or less function modules depending on the specific applications.

Figure 6:
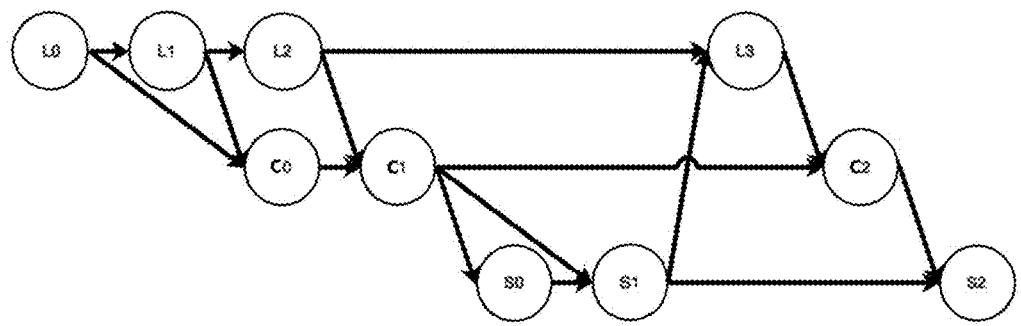
FIG. 6 shows an example of a directed acyclic graph involved in the present disclosure.

In the present disclosure, the specific order in which the instruction reading and distribution module 510 reads the instructions may be obtained by topologically sorting the instructions according to a directed acyclic graph that consist of the types and dependency relationships. FIG. 6 shows an example of a directed acyclic graph involved in the present disclosure.

A directed acyclic graph for performing reading of the present disclosure in a specific order can be constructed when multiple types of instructions possessed by the system conform to the following characteristics:
(1) the execution of instructions of different types is parallel;
(2) the execution of instructions of the same type is serial;
(3) there is a certain interdependence relationship between the instructions of different types; and
(4) there is no deadlock in the interdependence relationship.

When each type of instructions conforms to the above-mentioned characteristics, a directed acyclic graph as shown in FIG. 6 can be constructed. For convenience of explanation, it is assumed that there are three types of instructions in the system, namely LOAD, STORE and CALC, which are used to load data, store data and calculate data, respectively. In a certain program, the dependence of these three types of instructions is shown in FIG. 6. Herein, Ln denotes the nth LOAD instruction, Cn denotes the nth CALC instruction, Sn denotes the nth STORE instruction, the arrows denote the dependency relationships, the head of the arrow depends on the tail of the arrow, and the tail of the arrow is depended on by the head of the arrow.

As shown in FIG. 6, C0 depends on L0 and L1, indicating that C0 is executed after both L0 and L1 have been executed; S0 and S1 both depend on C1, indicating that S0 and S1 can be executed as long as C1 has been executed, but since the instructions of the same type can only be executed sequentially in their internal, naturally, S1 depends on S0, that is, S1 is executed after S0 has been executed; and other dependencies can be done by analogy.

Figure 7:
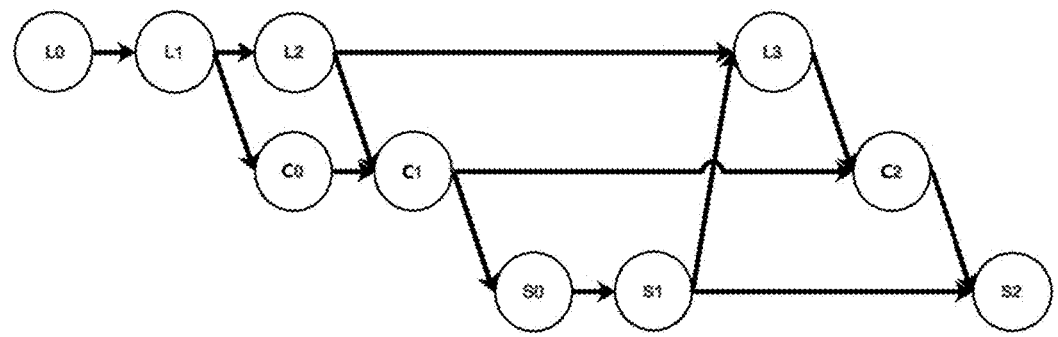
FIG. 7 shows an example of a simplified directed acyclic graph involved in the present disclosure.

Since the instructions of the same type can only be executed serially, it is possible to simplify the directed acyclic graph, for example the DAG shown in FIG. 6. Specifically, dependencies of a certain instruction on two or more instructions of another type may be simplified into a direct dependency on the last instruction in the two or more instructions of the another type, and dependencies of two or more instructions in the same type on a certain instruction of another type may be simplified into a direct dependency of the earliest instruction in the two or more instructions of the same type on the certain instruction of the another type, and a direct dependency of a subsequent instruction in the two or more instructions of the same type on a previous instruction. Correspondingly, in the example of FIG. 6, C0 depending on L0 and L1 may be simplified into solely depending on L1; both S0 and S1 depending on C1 may be simplified into only S0 depending on C1, and S1 only depending on S0. Thus, a simplified FIG. 7 can be obtained. FIG. 7 shows an example of a simplified directed acyclic graph involved in the present disclosure.

Thus, the dependency relationships between L0-3, C0-2, and S0-2 are abstracted into the simplified directed acyclic graph shown in FIG. 7. Acyclic ensures that there is no deadlock between the dependency relationships.

Herein, if the instruction reading module in the system reads using the simplest serial design, that is, acquires an instruction, determines whether it is decided to be executed by the dependency relationships, and then acquires the next instruction after execution, there may be a case that an instruction ready to be executed depends on an unread instruction, thereby causing the system to deadlock. However, by topologically sorting the directed acyclic graph shown in FIG. 7, the instructions are sequentially read in the sorted order, which can ensure that the deadlock situation as described above does not occur. The directed acyclic graph shown in FIG. 7 can be topologically sorted, thereby obtaining the following specific order for instruction reading:
L0→L1→C0→L2→C1→S0→S1→L3→C2→S2, For C0 and L2 that can be executed in parallel and have no dependency relationships with each other, the order of reading can be arbitrarily changed. Therefore, the following order of acquiring instructions is also true:
L0→L1→L2→C0→C1→S0→S1→L3→C2→S2.

In the case that the instruction reading module adopts a more complex design to improve the efficiency, the above-mentioned value-setting instructions can also be adjusted under certain constraints, and the above-mentioned adjustments are also within the scope covered by the disclosed principle of the present disclosure.

By performing instruction reading in the order of topologically sorting the directed acyclic graph described above, the instruction reading and distribution module 510 can easily avoid the case that an instruction ready to be executed depends on an unread instruction, thereby causing the system to deadlock. The above-described sorting of instructions may be implemented by, for example, a specialized sorting module included in the system when the instructions are fed into the high parallelism computing system of the present disclosure, or may be performed, for example, during an instruction compiling phase (described in more detail below).

In an embodiment, the instruction reading and distribution module 510 may distribute corresponding instructions to the plurality of function modules in the specific order of reading the instructions. In another embodiment, the instruction reading and distribution module 510 may implement parallel distribution of various types of instructions and parallel execution of various types of instructions by corresponding function modules by constructing a specialized dependency matrix.

FIG. 5 further shows that the instruction reading and distribution module 510 may optionally include a dependency matrix 511 to address the dependency issues between various types of instructions when distributing the instructions. The dependency matrix 511 may include a plurality of indicators each for indicating whether each type of instructions depend on a certain other type of instructions, and at least when the indicators indicate that a certain type of instructions do not depend on all other types of instructions, distribute corresponding instructions to a function module for executing the certain type of instructions.

In an embodiment, the plurality of indicators included in dependency matrix 511 may be a plurality of counters, wherein each counter indicates the number of dependencies that a certain type of instructions to another type of instructions. It is assumed that there are N types of instructions in the system. If each type of instructions have depending and depended relationships with instructions of other types, the matrix can be composed of N×(N−1) counters, and the initial value can be set to zero. When the read instruction A depends on another type of instruction B, it is determined whether a corresponding counter (A_dpdon_B) is greater than zero, and if it is greater than zero, it is decremented by one, and is executed; and when the read instruction A is depended on by another type of instruction B, then the corresponding counter is incremented by 1 (B_dpdon_A) and is executed.

Similarly, a system where the three types of instructions including LOAD, STORE, and CALC shown in FIGS. 6 and 7 are used to load data, store data, and calculate data, respectively, is taken an example. The dependency matrix included in the instruction reading and distribution module of the system may be composed of six counters, as shown in the following table.

| | Depended | | |
|---|---|---|---|
| Depending | LOAD | CALC | STORE |
| LOAD | N/A | l_dpdon_c | l_dpdon_s |
| CALC | c_dpdon_l | N/A | c_dpdon_s |
| STORE | s_dpdon_l | s_dpdon_c | N/A |

That is, the dependency matrix consists of six counters, which are:
LOAD depending on CALC(l_dpdon_c);
LOAD depending on STORE(l_dpdon_s);
CALC depending on LOAD(c_dpdon_l);
CALC depending on STORE(c_dpdon_s);
STORE depending on LOAD(s_dpdon_l); and
STORE depending on CALC (s_dpdon_c).

Herein, N/A means that since the execution of the same type of instructions are serial, the execution of the same type of instructions naturally depends on the execution of the previous instructions of the same type being completed.

When the instructions are read in the order of L0→L1→C0→L2→C1→S0→S1→L3→C2→S2, the process of determining the dependency is as follows:

L0: not being depended on by other types of instructions, and being directly executed;
L1: being depended on by CALC, c_dpdon_l being incremented by one, and L1 being executed;
C0: depending on LOAD, because c_dpdon_l is equal to 1 at this time, c_dpdon_l being decremented by one, and C0 being executed;
L2: being depended on by CALC, c_dpdon_l being incremented by one, and L2 being executed;
C1: depending on LOAD, because c_dpdon_l is equal to 1 at this time, c_dpdon_l being decremented by one, while being depended on by STORE, s_dpdon_c being incremented by one, and C1 being executed;
S0: depending on CALC, because s_dpdon_c is equal to 1 at this time, s_dpdon_c being decremented by one, and S0 being executed;
S1: being depended on by LOAD, l_dpdon_s being incremented by one, and S1 being executed;
L3: depending on STORE, because l_dpdon_s is equal to 1 at this time, l_dpdon_s being decremented by one, while being depended on by CALC, c_dpdon_l being incremented by one, and L3 being executed;
C2: depending on LOAD, because c_dpdon_l is equal to 1 at this time, c_dpdon_l being decremented by one, while being depended on by SAVE, s_dpdon_c being incremented by one, and C2 being executed;
S2: depending on CALC, because s_dpdon_c is equal to 1 at this time, s_dpdon_c being decremented by one, and S0 being executed;
END: the execution of all instructions is completed, and each counter in the dependency matrix should be in the zero state.

Thus, the instruction reading and distribution module (e.g., the instruction reading and distribution module 511 shown in FIG. 5) may distribute an instruction to be distributed directly based on an indication (e.g., whether the reading of the corresponding counter is greater than zero) of a corresponding indicator and an indication of a corresponding function module completing previous instructions without receiving an end-of-execution indication of other types of instructions on which the instruction to be distributed depends. Correspondingly, the instruction reading and distribution module further includes a first in first out queue (FIFO) for buffering the pre-read instructions. It should be understood that although the above example shows six counters for a dependency matrix, in a specific application, if not each type of instructions have a dependency relationship with all other types of instructions, the number of counters can be reduced accordingly. In other words, a counter for indicating a dependency relationship that does not actually exist can be omitted.

Herein, the acquisition of the dependency information between the instructions may be directly obtained by the instruction reading and distribution module reading various types of instructions. In an embodiment, the instructions read by the instruction reading and distribution module may include explicit dependency relationships of the instructions with other instructions, and thus the instruction reading and distribution module may update a value of each counter in the dependency matrix according to the explicit dependency relationships and distribution of the instructions. Similar to the specific sorting of instruction reading, it can be implemented by, for example, a specialized explicit dependency relationship determination module included in the system when the instructions are fed into the high parallelism computing system of the present disclosure, or can be performed, for example, in the instruction compiling phase (described in more detail below).

Figure 8:
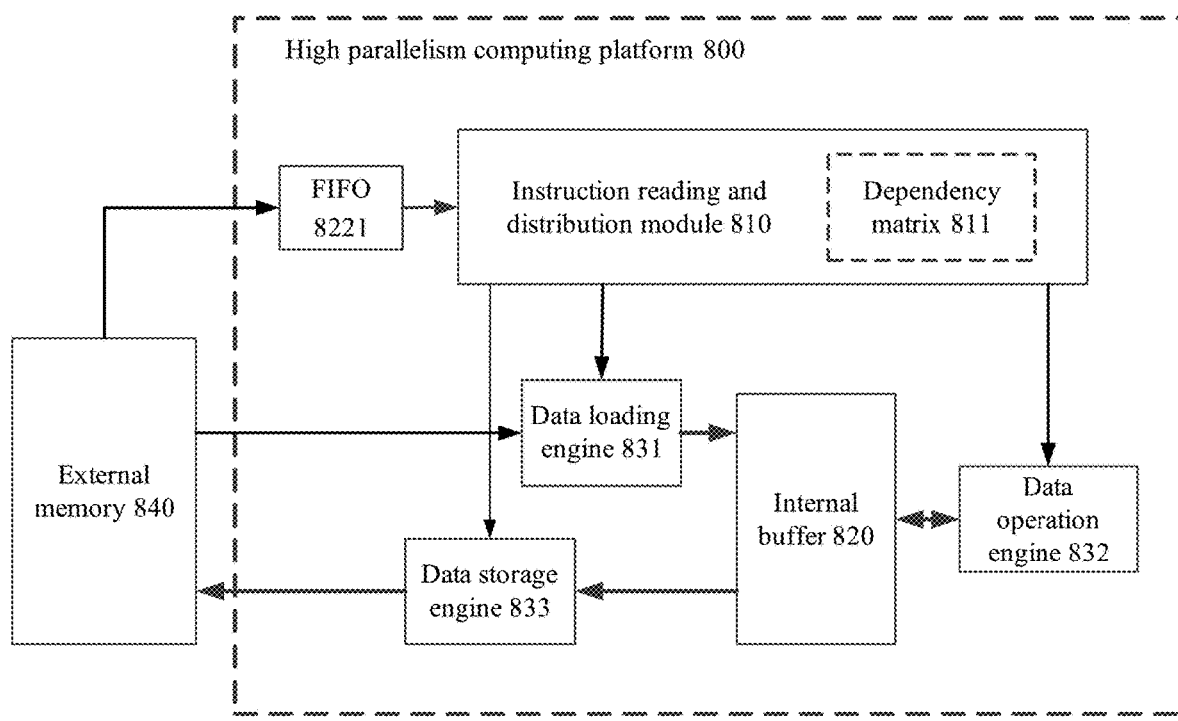
FIG. 8 shows a composition schematic diagram of a high parallelism computing system according to another embodiment of the present disclosure.

In an embodiment, the plurality of function modules shown in FIG. 5 may particularly be implemented as a data loading engine, a data operation engine, and a data storage engine. FIG. 8 shows a composition schematic diagram of a high parallelism computing system according to another embodiment of the present disclosure. In the figure, a thin solid line indicates an instruction path, and a thick solid line indicates a data path.

As shown in the figure, the neural network computing system 800 of FIG. 8 also includes an instruction reading and distribution module 810 and an internal buffer 820. Further, the plurality of function modules of the computing system 800 may be a data loading engine 831, a data operation engine 832, and a data storage engine 833, respectively. The three engines share an internal buffer 820, and the data loading engine 831 and the data storage engine 833 can perform data interaction with an external memory 840, for example, via a bus or other communication mechanism. In this example, the internal buffer 820 may be a buffer dedicated to storing the data for the calculation. Thus, the instruction reading and distribution module 810 can read instructions from the external memory 840 via a specialized first in first out queue (FIFO) 821. In another embodiment, FIFO 821 may also be incorporated into the internal buffer 820.

The data loading engine 831 can execute a data loading instruction that loads data for performing computation from the external memory to the internal buffer. In the case of neural network computation, the loaded data may include parameter data and feature map data. The parameter data may include weight data (e.g., convolution kernels) and other parameters such as biases. The feature map data may include input image data, and may also include intermediate calculation results of the respective convolutional layers. The data operation engine 832 can execute a data operation instruction that reads data from the internal buffer 820 to perform an operation and stores the operational result back to the internal buffer 820. The data storage engine 833 can then execute a data storage instruction that stores the operational result from internal buffer 820 back to the external memory 840.

The instruction reading and distribution module 810 may also include a dependency matrix 811. Preferably, the dependency matrix 811 may include at least a first indicator for indicating that the data loading instruction depends on the data storage instruction, a second indicator for indicating that the data operation instruction depends on the data loading instruction, and a third indicator for indicating that the data storage instruction depends on the data operation instruction. Other indicators may also be included when there are other dependency relationships (e.g., where there is the data operation instruction depending on the data storage instruction, an additional indicator such as a fourth indicator indicating the above dependency relationship may be additionally included).

Thus, the instruction reading and distribution module 810 may distribute a next data loading instruction to the data loading engine, based on an end flag of the data loading engine executing a current data loading instruction and an indication of the first indicator that the data loading instruction does not depend on the data storage instruction; and/or may distribute a next data operation instruction to the data operation engine based on an end flag of the data operation engine executing a current data operation instruction and an indication of the second indicator that the data operation instruction does not depend on the data loading instruction; and/or may distribute a next data storage instruction to the data storage engine based on an end flag of the data storage engine executing a current data storage instruction and an indication of the third indicator that the data storage instruction does not depend on the data operation instruction.

Thus, the instruction reading and distribution module of the present disclosure can update the readings of the counters in the dependency matrix by, for example, based on the explicit dependency relationships included in the respective read instructions, and when distributing tasks for instructions for a plurality of function modules (acceleration engines), it is possible to make a reasonable determination as to whether to distribute the next instruction only based on the instruction execution state (for example, an end flag of a previous instruction) of the engine itself and the reading (whether it is greater than zero) of the relevant counter, avoiding the deadlock issue caused by instruction dependencies.

The instruction distribution scheme of the present disclosure is particularly applicable for a neural network computing system in which the instruction types are relatively less, and each engine may be highly parallel, and the data for performing computation in the internal buffer may be feature map data and parameter data for performing neural network computation. In an embodiment, the computing system is implemented at least in part by a GPU, an FPGA or an ASIC.

Figure 9:
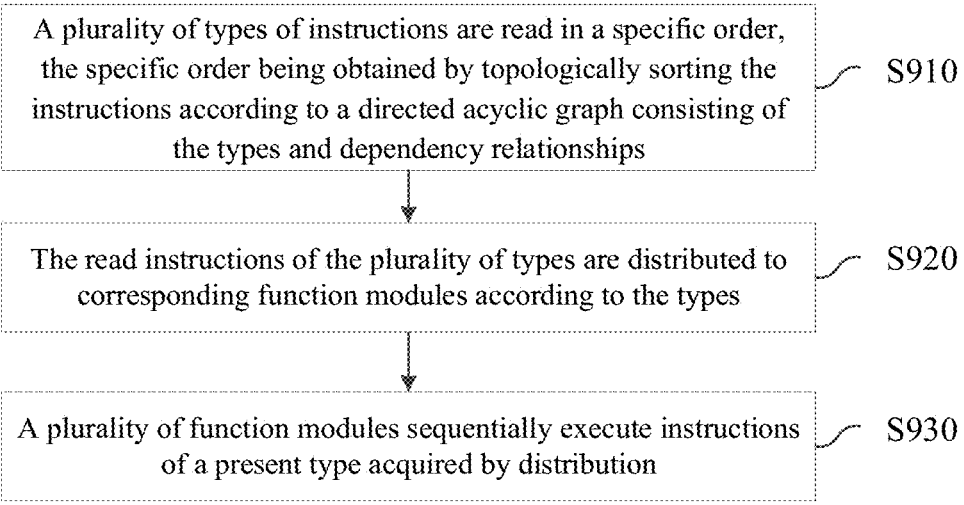
FIG. 9 shows a schematic flow chart of a high parallelism instruction scheduling method according to an embodiment of the present disclosure.

The instruction scheduling scheme of the present disclosure may also be implemented as a high parallelism instruction scheduling method. The instruction scheduling distribution can be implemented, for example, by the high parallelism computing system described above. FIG. 9 shows a schematic flow chart of a high parallelism instruction scheduling method according to an embodiment of the present disclosure.

At step S910, a plurality of types of instructions are read in a specific order, the specific order being obtained by topologically sorting the instructions according to a directed acyclic graph consisting of the types and dependency relationships. At step S920, the read instructions of the plurality of types are distributed to corresponding function modules according to the types. At step S930, a plurality of function modules sequentially execute instructions of a present type acquired by distribution.

In an embodiment, the instruction scheduling method may further include: constructing a dependency matrix based on the dependency relationships of the instructions, the dependency matrix including a plurality of indicators each for indicating whether each type of instructions depend on a certain other type of instructions. Correspondingly, step S920 may include: at least when the indicators indicate that a certain type of instructions do not depend on all other types of instructions, distributing corresponding instructions to a function module for executing the certain type of instructions.

The plurality of indicators may be a plurality of counters, wherein each counter indicates the number of dependencies that a certain type of instructions to another type of instructions. Thus, the instruction scheduling method may further comprise: acquiring explicit dependency relationships of the instructions with other instructions included in the read instructions, and constructing the dependency matrix based on the dependency relationships of the instructions may comprise: updating a value of each counter in the dependency matrix according to the explicit dependency relationships and the distribution of instructions. Thus, step S920 may include: distributing corresponding instructions to the function module for executing the certain type of instructions directly based on indications of corresponding indicators and indications of the corresponding function modules completing previous instructions without receiving end-of-execution indications of other types of instructions on which the instructions to be distributed depend.

Specifically, the acquired instructions of the plurality of types include: a data loading instruction that loads data for performing computation from the external memory to the internal buffer; a data operation instruction that reads the data from the internal buffer to perform an operation and stores the operational result back to the internal buffer; and a data storage instruction that stores the operational result from the internal buffer back to the external memory. Therefore, the corresponding function modules may include: a data loading engine; a data operation engine; and a data storage engine. The dependency matrix includes at least a first indicator for indicating that the data loading instruction depends on the data storage instruction, a second indicator for indicating that the data operation instruction depends on the data loading instruction, and a third indicator for indicating that the data storage instruction depends on the data operation instruction.

Correspondingly, distributing the corresponding instructions to the function module for executing the certain type of instructions directly based on the indications of the corresponding indicators and the indications of the corresponding function modules completing previous instructions without receiving the end-of-execution indications of other types of instructions on which the instructions to be distributed depend may comprise: distributing a next data loading instruction to the data loading engine, based on an end flag of the data loading engine executing a current data loading instruction and an indication of the first indicator that the data loading instruction depends on the data storage instruction; and/or distributing a next data operation instruction to the data operation engine based on an end flag of the data operation engine executing a current data operation instruction and an indication of the second indicator that the data operation instruction depends on the data loading instruction; and/or distributing a next data storage instruction to the data storage engine based on an end flag of the data storage engine executing a current data storage instruction and an indication of the third indicator that the data storage instruction depends on the data operation instruction.

In order to further improve the parallel processing efficiency, a finer granularity of parallelism between dependent instructions can be utilized, so that a subsequent instruction can start to be executed depending on a part of the current instruction, thereby increasing the overlapping degree of the instruction execution. Thus, the execution efficiency of neural network inference calculations is improved as a whole.

Figure 10:
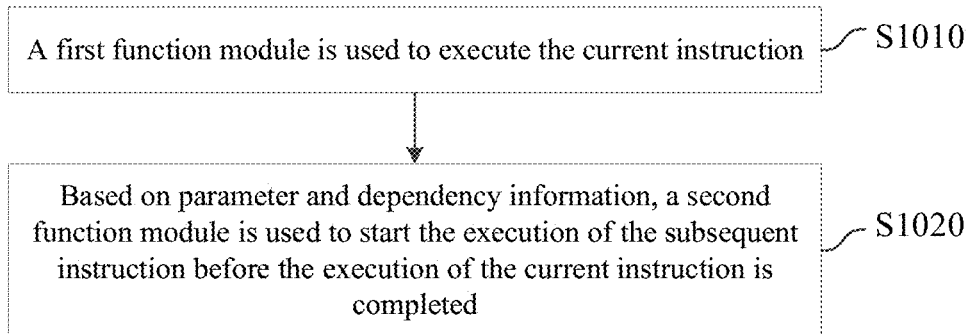
FIG. 10 shows a schematic flow chart of a neural network compiling method according to an embodiment of the present disclosure.

FIG. 10 shows a schematic flow chart of an instruction scheduling method for performing neural network computation according to an embodiment of the present disclosure. This method can be considered as a specific implementation of the above step S930, namely, sub-steps of step S930. It should be understood that the above-mentioned instruction scheduling method may be implemented by a computing system for performing neural network computation, and for example, may be implemented by the deep learning specialized processor (DPU) as described above or other hardware platforms for performing neural network inference.

At step S1010, a first function module is used to execute the current instruction. Then, in step S1020, based on at least parameter information of the current instruction and dependency information of a subsequent instruction directly depending on the current instruction, a second function module is used to start the execution of the subsequent instruction before the execution of the current instruction is completed.

In a multiple instruction multiple data stream system such as a neural network computing system, there are often two or more function modules (e.g., acceleration engines), and each function module executes instructions corresponding thereto. Each function module can execute its own instructions in parallel, and there are certain dependency relationships between the instructions of different function modules. The present disclosure can utilize a finer granularity of parallelism between dependent instructions, so that a subsequent instruction can start to be executed depending on a part of the current instruction, thereby increasing the overlapping degree of the instruction execution. Thus, the execution efficiency of neural network inference calculations is improved as a whole.

In an embodiment, for step S1020, the method may further include: based on at least type information of the current instruction and the subsequent instruction, dividing the execution of the current instruction into two phases of dependency and no dependency; generating an end flag of the current instruction directly when the dependency phase has been completed; and based on at least the end flag of the current instruction, using the second function module to execute the subsequent instruction. Herein, after the execution of the phase in which the current instruction is actually depended on is completed, an instruction end flag may be issued ahead of time, thereby starting the execution of the subsequent instruction.

In another embodiment, for step S1020, the method may further include based on at least the parameter information and the dependency information, dividing the execution of the current instruction into a plurality of phases; generating a phase end flag when at least one phase of the plurality of phases has been completed; and based on at least the phase end flag, using the second function module to execute the subsequent instruction. In other words, the processor can further divide the acquired instructions into smaller granularities based on the parameters of the acquired instructions and the execution order and dependency relationships between the instructions in the actual neural network inference calculation execution process. The end flag generated internally by the processor for the above-mentioned smaller granularity execution enables a subsequent instruction having a dependency relationship to be executed ahead of time based on the above-mentioned smaller granularity dependency. Thus, the execution efficiency of neural network inference calculations is improved as a whole.

The dependencies between the instructions typically include dependencies on the results of running previous instructions or dependencies on the hardware used to run the previous instructions. In the case of having a dependency on the running result, based on at least the end flag that the at least one phase of the plurality of phases has been completed, using the second function module to execute the subsequent instruction may comprise: based on the data obtained from the at least one phase that has been completed, using the second function module to execute the subsequent instruction.

For neural network inference, because the operation involved by itself is relatively simple (the types of layers involved in the neural network model algorithm is limited), the amount of data is huge, and the parallelism of each dimension is flexible, the neural network computing operation instructions acquired by the neural network computing platform have a larger granularity. The above-mentioned larger granularity instructions make the neural network model have wider adaptability to various neural network computing platforms (for example, neural network specialized processors), and also provide a space for finer granularity operation realization of each computing platform.

A scheme that utilizes finer granularity parallelism between dependent instructions can also be implemented in the system as described above with reference to FIGS. 5 and 8.

As shown in FIG. 5, the plurality of function modules 530 may be a plurality of function modules that perform respective functions based on the acquired instructions for performing neural network computation. The internal buffer 520 may buffer the data for performing neural network computation. The instruction reading and distribution module 510 is then configured to control the operation of the plurality of function modules 530 and the internal buffer 520. The thin arrows in the figure refer to the transmission of control instructions, and the thick arrows refer to the transfer of data. The word "plurality" in the plurality of function modules refers to two or more. Although three function modules are shown in the figure, it should be understood that the computing system 500 may have more or less function modules depending on the specific applications.

The instruction reading and distribution module 510 may be configured to execute the current instruction using the first function module, and based on at least parameter information of the current instruction and dependency information of a subsequent instruction directly depending on the current instruction, may use a second function module to start the execution of the subsequent instruction before the execution of the current instruction is completed. Herein, the first function module and the second function module may be any one module of the plurality of function modules 530. The words "first" and "second" are only used to distinguish between different modules, and do not imply any suggestion of the order or importance of the modules. It should also be understood that as the instructions are executed, the roles between the plurality of function modules may vary. In other words, it is determined according to the currently executing instruction which function module is the first function module that is executing the current instruction and which function module is the second function module that will execute the subsequent instruction.

The instruction reading and distribution module 510 is configured to use the second function module to start execution of the subsequent instruction before the execution of the current instruction is completed, which can be understood as the instruction reading and distribution module 510 acquiring an instruction end flag issued ahead of time by the first function module before the actual execution of the current instruction is completed, and starting the second function module to execute the subsequent instruction ahead of time by sending the subsequent instruction to the second function module ahead of time.

The internal buffer 520 may also usually include instruction data in the data read from the external memory. Thus, in an embodiment, the instruction reading and distribution module 510 can read the instruction data from the internal buffer 520.

Instructions for performing neural network computation may include explicit dependency information for instructions with other instructions. The explicit dependency information described above may be compiled, for example, by a specialized neural network compiler based on an input neural network algorithm model in the instruction compilation phase. In the case where the instruction reading and distribution module 510 is a control module for performing instruction reading and distribution, the instruction reading and distribution module 510 may acquire compiled instructions for performing neural network computation while acquiring the explicit dependency information described above, and the above information may be used as dependency information for the subsequent instruction directly depending on the current instruction.

In an embodiment, the instruction reading and distributing module 510 may be further configured to: based on at least type information of the current instruction and the subsequent instruction, dividing the execution of the current instruction into two phases of dependency and no dependency; generating an end flag of the current instruction directly when the dependency phase has been completed; and based on at least the end flag of the current instruction, using the second function module to execute the subsequent instruction. When the instruction reading and distribution module 510 is a control module for performing instruction reading and distribution, the above-described phase division may also be implemented by a specialized neural network compiler in the instruction compiling phase, for example, the first function module may directly generate the end flag of the current instruction after the dependency phase is completed, and after receiving the end flag, the control module 530 of the instruction reading and distribution may directly distribute a subsequent instruction to the second function module for execution.

In an embodiment, the instruction reading and distributing module 510 may be further configured to: based on at least the parameter information and the dependency information, dividing the execution of the current instruction into a plurality of phases; and generating a phase end flag when at least one phase of the plurality of phases has been completed; and based on at least the phase end flag, using the second function module to execute the subsequent instruction. Similarly, when the instruction reading and distribution module 510 is a control module for performing instruction reading and distribution, the above-described phase division may also be implemented by a specialized neural network compiler in the instruction compiling phase, for example, the first function module may generate a phase end flag after a certain phase is completed, and after receiving the phase end flag, the control module 510 of the instruction reading and distribution may directly distribute a subsequent instruction to the second function module for execution. Subsequently, the first function module can, for example, continuously send an end flag of the execution completion of each phase to the second function module, so that the second function module can perform a corresponding fine granularity dependency operation.

In an embodiment, the plurality of function modules 530 can be a more specific acceleration engine, such as the data loading engine 831, the data operation engine 832, and the data storage engine 833 shown in FIG. 8. The three engines share an internal buffer 820, and the data load engine 831 and the data storage engine 833 can perform data interaction with the external memory 840, for example, via a bus or other communication mechanism.

The data loading engine 831 can execute a data loading instruction that loads data for performing neural network computation from the external memory to the internal buffer. The loaded data may include parameter data and feature map data. The parameter data may include weight data (e.g., convolution kernels) and other parameters such as biases. The feature map data may include input image data, and may also include intermediate calculation results of the respective convolutional layers. The data operation engine 832 can execute a data operation instruction that reads the weight data and the feature map data from the internal buffer 820 to perform an operation and stores the operational result back to the internal buffer 820. The data storage engine 833 can then execute a data storage instruction that stores the operational result from internal buffer 820 back to the external memory 840. It will be appreciated that the data loading engine 831, the data operation engine 832, and the data storage engine 833 implement respective instruction functions under the scheduling of internal instruction reading and distribution module 810.

Correspondingly, the acquired instructions for neural network computation may include: a data loading instruction that loads data for neural network computation from the external memory to the internal buffer, the data for neural network computation includes parameter data and feature map data; a data operation instruction that reads the parameter data and the feature map data from the internal buffer to perform an operation and stores the result of the operation back to the internal buffer; and a data storage instruction that stores the operational result from the internal buffer back to the external memory.

Figure 11A:
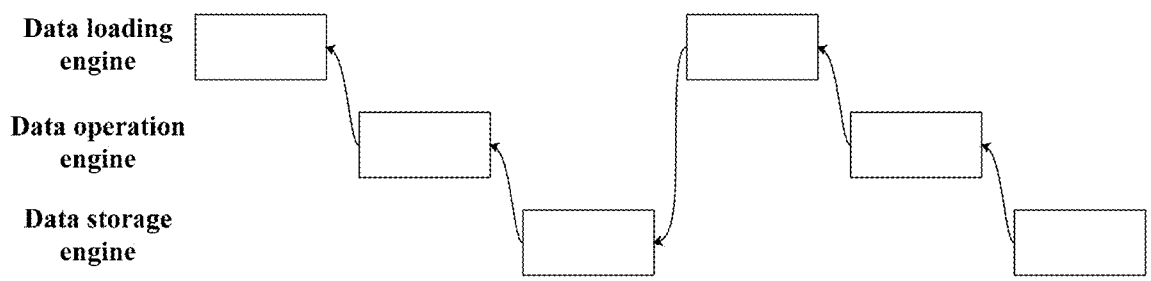
FIGS. 11A and 11B show the execution states of instructions having dependency relationships.
Figure 11B:
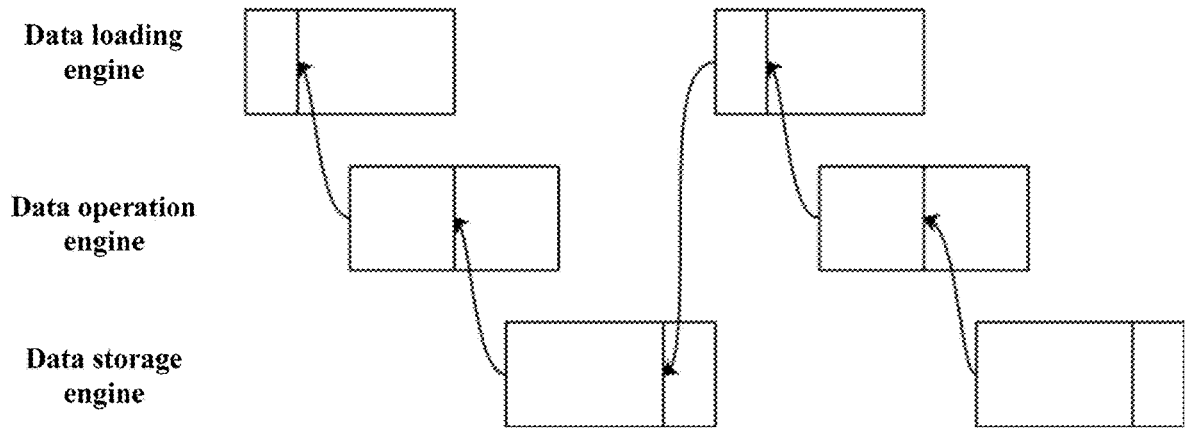

FIGS. 11A and 11B show the execution states of instructions having dependency relationships. As shown in FIG. 11A, the execution of the next instruction depending on the execution result of the current instruction can be started only if a previous function module completes the current instruction. For example, when the data loading engine performs data loading based on the current data loading instruction, only if the indication information that the data loading engine issues the completion of the current instruction is received, the execution of the data operation instruction based on the above-described loaded data can be started by the data operation engine.

However, in the computing system utilizing the instruction scheduling principle of the present disclosure, for example, in a neural network specialized processor, the execution of the subsequent instruction may be started using other engines before the execution of the current instruction is completed, as shown in FIG. 11B. Thus, the overall computational efficiency of the computing system is improved by temporally partially superimposing the execution of the instructions that originally have dependency relationships.

Returning to FIG. 10, in step S1020, based on at least the parameter information and the dependency information, the execution of the current instruction may be divided into a plurality of phases; a phase end flag is generated when at least one phase of the plurality of phases has been completed; and based on at least the phase end flag, the second function module is used to execute the subsequent instruction. A granularity size of the plurality of phases divided is be determined based on at least a granularity size of instructions for performing neural network computation and parameters of the computing system for performing neural network computation. In other words, the internal instruction reading and distribution module of the computing system (e.g., the instruction reading and distribution module 510 or 810) can determine the granularity of instruction-optimized scheduling for use within the computing system according to the size of the instruction granularity of the acquired neural network model algorithm and the parameters of the computing system itself, and can send a fine granularity end flag to the function module for executing the subsequent instruction, so that the function module can start the execution of the subsequent function before acquiring the indication information that the execution of the previous instruction is completed.

In an embodiment, step S1010 may include using a data loading engine to execute a current data loading instruction. Step S1020 may include: before acquiring indication information that the execution of the current data loading instruction is completed, in response to completing loading of weight and feature map data of at least one complete operation unit, using a data operation engine to start the execution of the data operation instruction. Herein, the first function module is a data loading engine, and the second function module is a data operation engine.

In a specific neural network acceleration application, the appropriate parallel strategy will be selected according to the actual situation to perform the convolution calculation shown in FIG. 2. The above parallel calculation can be performed in any one or more of the channel (C), the length and width (W×H), and the batch (B). The instruction scheduling strategy of the present disclosure may determine the fine granularity correspondence of the current data loading instruction and the subsequent data operation instruction, according to the order in which the data loading engine loads the data based on the data loading instruction, and the parallel operation scheme adopted by the data operation engine based on the subsequent data operation instruction, and perform the corresponding computation.

For example, when a weight-stationary architecture is adopted, since the data loading module may first load the weights, and then, for example, the feature values is loaded line by line, after the data for a complete operation unit is loaded (or after the data for the operation unit performing the parallel operation in one clock cycle is loaded), the data operation engine is used to read the corresponding data from the internal buffer for computation. The computing system may reasonably determine the granularity of the current data loading instruction and the subsequent data running instruction according to the weight-stationary architecture described above, the granularity of the previous data loading instruction, and the data operation parallelism in the data operation engine, and a convolution (multiplication and addition) operation corresponding to, for example, line-by-line loading of feature values is implemented in a manner corresponding to the granularity.

Correspondingly, when a feature map stationary architecture is adopted, since the data loading module may first load the feature values for the computation and then load the convolution kernels one by one, after the data used by a complete operation unit is loaded (or after the data used by the operation unit performing the parallel operation in one clock cycle is loaded), the data operation engine is used to read the corresponding data from the internal buffer for computation. The computing system may reasonably determine the granularity of the current data loading instruction and the subsequent data running instruction according to the feature map stationary architecture described above, the granularity of the previous data loading instruction, and the data operation parallelism in the data operation engine, and a convolution (multiplication and addition) operation corresponding to, for example, one-by-one loading of convolution kernels is implemented in a manner corresponding to the granularity.

When performing data loading, other data multiplexing strategies (such as a row stationary architecture) may be used, or neural network computing instructions that adopt other data multiplexing strategies or the like may be acquired. Regardless of the strategy adopted, the neural network computing system of the present disclosure can give a reasonable instruction scheduling scheme based on the above-mentioned multiplexing information, its own architecture information and the dependency relationships of the instructions itself, thereby implementing partially parallel processing of subsequent dependent instructions more reasonably and efficiently.

In an embodiment, step S1010 may include using a data operation engine to execute a current data operation instruction. Step S1020 may include: before acquiring indication information that the execution of the current data operation instruction is completed, in response to generation of at least one operational final result, buffering the at least one operational final result to the internal buffer, and using a data storage engine to start the execution of the data storage instruction to store the at least one operational final result from the internal buffer back to the external memory. Herein, the first function module is a data operation engine, and the second function module is a data storage engine.

When the data operation instruction is followed by the data storage instruction, the instruction reading and distribution module may give a corresponding calculation end flag to the data storage engine with respect to an output feature map calculation result (i.e., the calculation result to be stored back to the external memory, instead of an intermediate calculation result to be used by the current data operation instruction again) obtained by batch according to the parameters of the specific operation instruction. Then, the data storage engine can give the calculation end flag one by one, and store the output feature map back to the external memory with the corresponding granularity.

In an embodiment, step S1010 may include using a data storage engine to execute a current data storage instruction, and Step S1020 may include: in response to output feature map data that the data storage engine stores back to the external memory having no dependency relationships with input feature map data to be loaded from the external memory by the data loading instruction directly depending on the current data storage instruction, using a data loading module to start the execution of the data loading instruction after the output feature map data is written into a bus buffer zone. Herein, the first function module is a data storage engine, and the second function module is a data loading engine.

In most cases, the data to be loaded subsequently in the neural network has no dependency relationships with the data currently being stored, that is, the loaded data can be executed without waiting for the completion of the stored data. In this case, the storage instruction of the data is considered to be the end of execution without obtaining a response from the bus or a device. In the embodiment in which data is accessed via the bus, since the bus is occupied by the output data, the loaded data may be read again after the occupation of the output data ends. However, since the loaded data does not need to wait until the output data is actually stored in the external memory, the execution (e.g., granular segmentation execution) of subsequent data loading instructions may be started by a corresponding end flag (i.e., a processor internal flag indicating that the occupation of the output data on the bus ends, rather than indication information of the end of the data storage instruction) sent by the instruction reading and distribution module after the output feature map data is written to the bus buffer, for example.

The instruction scheduling scheme of the present disclosure may further be applicable for the finer granularity operations overlapping each other within the instructions. For example, batch normalization operations in neural network models can usually be done at the time of data loading. If the loaded data is recorded as Ld, the loaded parameter is recorded as Lw, and the actual loaded instructions may be Lw0, Lw1, ..., Lwn, Ld0, Ld2, ..., Ldm. Since there are no dependency relationships between the parameters, when Lw0-Lwn are executed, a subsequent instruction does not have to wait for the execution of a previous one to be completed, and the situation is similar when Ld0-Ldn are executed. In other words, there may be some overlap between the execution of Lw0-Lwn and Ld0-Ldn. However, execution of Ld0-Ldn may be after the execution of Lwn is completed, thereby ensuring that the parameters are all ready when the data is loaded. Thus, loading and operation for the BL layer described above are implemented at the same time.

In a specialized neural network computing platform, since high-parallelism computation is usually implemented by using a heterogeneous circuit such as a GPU, an FPGA, or an ASIC, the time for perform data operations is short in comparison with a data access operation of an external memory via a bus. In addition, the neural network model algorithm has the characteristics that the types of calculations involved are relatively simple, but the computation amount is extremely large. In view of this, the instruction scheduling scheme of the present disclosure further improves the efficiency of supplying data to the data operation engine by further dividing the block-dependent instructions into smaller granularities, and more intensively utilizes the data access to the bus. Thus, the efficiency of performing neural network computation of the neural network computing system is improved as a whole.

It should be understood that although the different types of instructions executed, respectively, by the plurality of function modules in the present disclosure have certain interdependency relationships, the execution of various types of instructions themselves may be parallel. In other words, the respective function modules can execute the instructions of the respective types in parallel, and achieve the reasonable execution of the dependent instructions under the direction of the instruction scheduling scheme described in the present disclosure. In other words, the current instruction and the first function module that executes the current instruction of the present disclosure may exist in a multiple form at the same time, and the subsequent instruction and the second function module that executes the subsequent instruction may also exist in a multiple form at the same time, thereby implementing multiple-dependency parallel execution of multiple modules.

Figure 12:
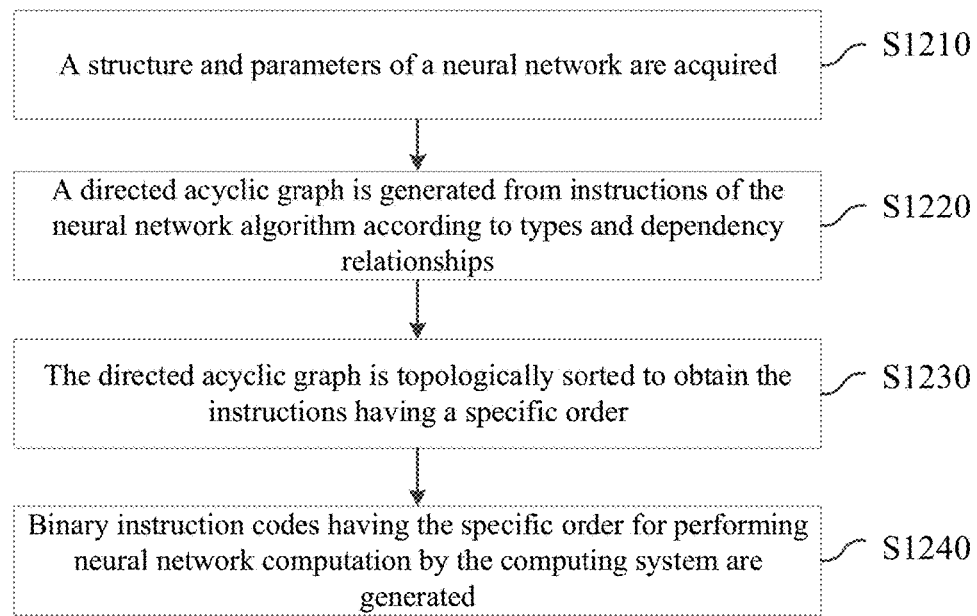
FIG. 12 shows a schematic flow chart of a neural network compiling method according to an embodiment of the present disclosure.

In an embodiment, the specific order of the read instructions mentioned above and/or the explicit dependency relationship information carried by the instructions may be implemented by compiling before the instructions are fed to the computing system, and for example, may be implemented by the specialized neural network compiler shown in FIG. 4. FIG. 12 shows a schematic flow chart of a neural network compiling method according to an embodiment of the present disclosure.

At step S1210, a structure and parameters of a neural network are acquired. At step S1220, a directed acyclic graph is generated from instructions for performing neural network computation according to types and dependency relationships based on the structure of the neural network. At step S1230, the directed acyclic graph is topologically sorted to obtain the instructions having a specific order. At step S1240, binary instruction codes having the specific order for performing neural network computation by the computing system described above are generated. The computing system may be a high parallelism computing system as described above.

Specifically, step S1220 may include: simplifying dependencies of a certain instruction on two or more instructions in another type into a direct dependency on the last instruction in the two or more instructions in the another type, and simplifying dependencies of two or more instructions in a same type on a certain instruction in another type into a direct dependency of the earliest instruction in the two or more instructions in the same type on the certain instruction in the another type, and a direct dependency of a subsequent instruction in the two or more instructions in the same type on a previous instruction, to obtain the simplified directed acyclic graphs.

Step S1240 may include: generating binary instruction codes that include an explicit dependency relationship of the current instruction with other instructions.

Thus, the high parallelism computing system and the instruction scheduling scheme thereof of the present disclosure can be combined with the prior instruction compilation, and the instruction dependency issue can be solved with a relatively simple implementation and less resource consumption.

Figure 13:
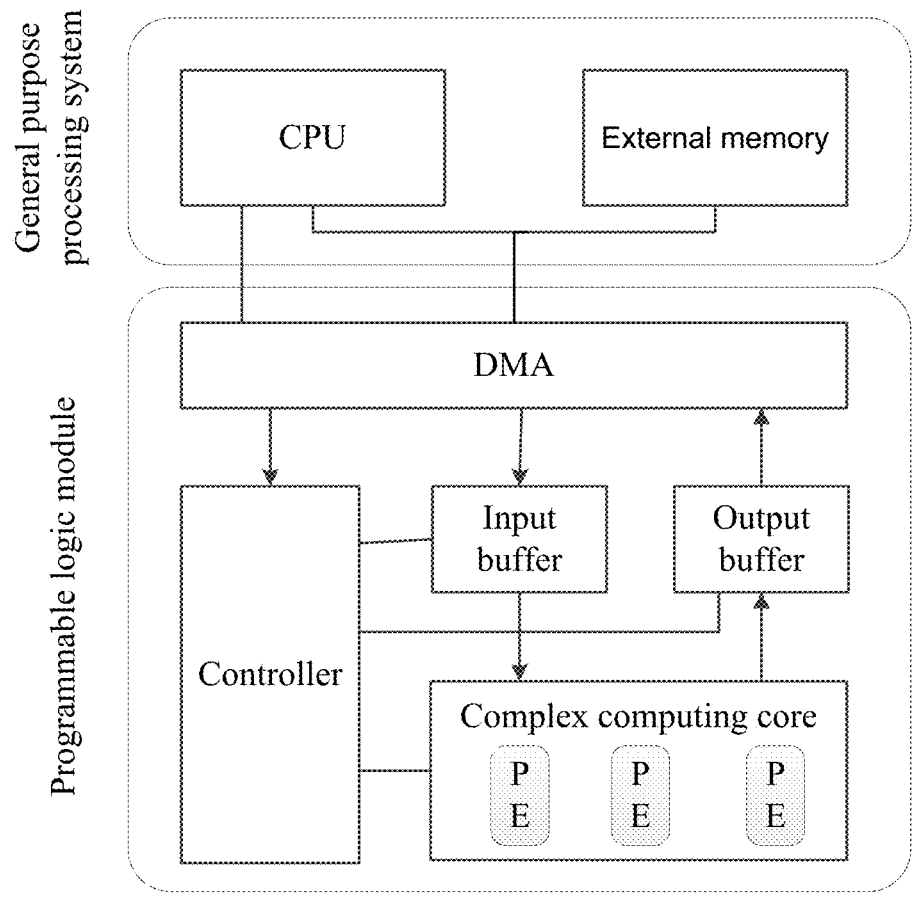
FIG. 13 shows an example of an SoC that can be used to implement the neural network computation involved by the present disclosure.

In an embodiment, the neural network computing system of the present disclosure may be implemented in a system on chip (SoC) that includes a general purpose processor, a memory, and a digital circuit. FIG. 13 shows an example of an SoC that can be used to implement the neural network computation involved by the present disclosure.

In an embodiment, a deep learning network, such as a convolutional neural network, may be implemented by a digital circuit portion (e.g., FPGA) on the SoC. For example, a neural network specialized processor implemented using a GPU, an FPGA, or an ASIC implements an instruction scheduling scheme according to the present disclosure. Since the neural network model performs parallel computation, it may be more efficient to implement neural network computing functions through logic hardware, especially GPUs, FPGAs, or ASICs, and lower power consumption than software execution can be achieved.

In an embodiment, all parameters related to the neural network obtained by previous training may be stored in a memory of the system on chip (e.g., a main memory, corresponding to the external memory in FIG. 8). When subsequently performing neural network inference calculations (e.g., target detection), the parameters of each layer of the neural network are first read from the main memory, and then executed by the programmable logic module shown in FIG. 13. It should be understood that the neural network computing system of the present disclosure can also be implemented using other architectures than that shown by the programmable logic module of FIG. 13.

It would also be understood by those skilled in the art that various illustrative logical blocks, modules, circuits, and algorithm steps described in connection with the disclosure herein may be implemented as electronic hardware, computer software, or combinations of both.

The flowchart and block diagrams in the accompanying drawings illustrate the system architecture, functionality and operation of possible implementations of systems and methods according to various embodiments of the present disclosure. In this regard, each block of the flowcharts or block diagrams may represent a module, a program segment, or a portion of code that includes one or more executable instructions for implementing the specified logical functions. It should also be noted that in some alternative implementations, the functions labelled in the blocks may also occur in different orders from the ones labelled in the accompanying drawings. For example, two consecutive blocks may be executed substantially in parallel in practice, and they may sometimes be executed in a reverse order, depending upon the functionality involved. It should also be noted that each block of the block diagrams and/or flowcharts, and combinations of blocks in the block diagrams and/or flowcharts, may be implemented by a specialized hardware-based system that performs specified functions or operations, or may be implemented by a combination of specialized hardware and computer instructions.

As previously mentioned, the present disclosure preferably implements the instruction scheduling scheme described above by logic hardware. Various modules involved in the present disclosure are preferably implemented by hardware.

Specifically, the instruction reading and distribution module may include three sub-modules that perform instruction reading, instruction classification, and instruction distribution, respectively, and a dependency matrix sub-module for recording depending and depended information. The instruction reading sub-module acquires instructions in order from corresponding locations of an internal storage implemented as a DDR, and then puts them into an instruction FIFO. The instruction classification sub-module fetches the instructions from the instruction FIFO, parses their instruction types, and puts the instructions into the FIFOs of the different types of distribution modules according to different types (N function modules/engines, which correspond to N types of instructions, and correspond to N distribution modules). The instruction distribution sub-module checks whether there is an unexecuted instruction inside its own FIFO, and if so, fetches the instruction, and according to the dependency information, queries the dependency matrix module until a feedback that it can be executed is obtained, then distributes the instruction to a corresponding engine; and when the execution of the instruction ends (the end information comes from the corresponding engine), the dependency matrix sub-module is updated according to the depended information of the instruction. The dependency matrix sub-module uses the counter described above to record depending and depended information, and accepts the dependency query and the update of the dependency matrix.

The function modules may include various types of engines. An engine includes an instruction decoding sub-module and an instruction execution sub-module. The instruction decoding sub-module obtains a dependent valid domain from an instruction after receiving the instruction. The instruction execution sub-module executes instructions according to the information in each domain, and here it may be generally subdivided into a data reading sub-module, a data storage sub-module and a data operation sub-module. The data operation sub-module may include a plurality of multiplication and addition units for performing high parallelism calculations, and the data reading sub-module and the data storage sub-module may include FIFOs for buffering data and several registers.

All the sub-modules as described above may include FIFOs for buffering instructions or data, and a state machine such as a finite state machine (FSM), for performing a state transition based on a preset state according to a control signal. The data storage sub-module and the data reading sub-module may additionally include a memory controller, and the operation sub-module may additionally include a high parallelism computing array.

We claim:

1. A system, comprising:
    an instruction reading and distribution circuit for reading a plurality of types of instructions in a specific order, and distributing the instructions to a plurality of function circuits according to the types;
    an internal buffer for buffering data and instructions for performing computation; and
    the plurality of function circuits each of which sequentially executes instructions of a present type distributed by the instruction reading and distribution circuit and reads the data from the internal buffer;
    wherein the specific order is obtained by topologically sorting the instructions according to a directed acyclic graph consisting of the types and dependency relationships,
    wherein the types of instructions comprise a data loading type, a data operation type, and a data storage type,
    wherein an instruction of the data loading type when executed loads data for performing computation from an external source to the internal buffer,
    wherein an instruction of the data operation type when executed reads the data from the internal buffer to perform an operation and stores an operational result back to the internal buffer, and
    wherein an instruction of the data storage type when executed stores the operational result from the internal buffer back to the external source.

2. The system of claim 1, wherein the directed acyclic graph simplify dependencies of a certain instruction on two or more instructions of another type into a direct dependency on the last instruction in the two or more instructions of the another type, and simplify dependencies of two or more instructions of a same type on a certain instruction of another type into a direct dependency of the earliest instruction in the two or more instructions of the same type on the certain instruction of the another type, and a direct dependency of a subsequent instruction in the two or more instructions of the same type on a previous instruction.

3. The system of claim 1, wherein the instruction reading and distribution circuit distributes corresponding instructions to the plurality of function circuits in the specific order of reading the instructions.

4. The system of claim 1, wherein the instruction reading and distribution circuit further includes a dependency matrix including a plurality of indicator circuits each for indicating whether each type of instructions depend on a certain other type of instructions, and at least when the indicator circuits indicate that a certain type of instructions do not depend on all other types of instructions, distributes corresponding instructions to a function circuit for executing the certain type of instructions.

5. The system of claim 4, wherein the plurality of indicator circuits are a plurality of counters, wherein each counter indicates a number of dependencies that a certain type of instructions to another type of instructions.

6. The system of claim 5, wherein the instructions read by the instruction reading and distribution circuit include explicit dependency relationships of the instructions with other instructions, and the instruction reading and distribution circuit updates a value of each counter in the dependency matrix according to the explicit dependency relationships and distribution of the instructions.

7. The system of claim 4, wherein the instruction reading and distribution circuit distributes instructions to be distributed directly based on indications of corresponding indicator circuits and indications of the corresponding function circuits completing previous instructions, without receiving end-of-execution indications of instructions of other types on which the instructions to be distributed depend.

8. The system of claim 4, wherein the plurality of function circuits include:
 a data loading circuit for a data loading instruction that loads data for performing computation from an external memory to the internal buffer;
 a data operation circuit for a data operation instruction that reads the data from the internal buffer to perform an operation and stores the operational result back to the internal buffer; and
 a data storage circuit for a data storage instruction that stores the operational result from the internal buffer back to the external memory.

9. The system of claim 8, wherein the dependency matrix includes at least the following indicator circuits:
 a first indicator circuit for indicating that the data loading instruction depends on the data storage instruction;
 a second indicator circuit for indicating that the data operation instruction depends on the data loading instruction; and
 a third indicator circuit for indicating that the data storage instruction depends on the data operation instruction.

10. The system of claim 9, wherein the instruction reading and distribution circuit distributes a next data loading instruction to the data loading circuit, based on an end flag of the data loading circuit executing a current data loading instruction and an indication of the first indicator circuit that the data loading instruction does not depend on the data storage instruction; and/or
 the instruction reading and distribution circuit distributes a next data operation instruction to the data operation circuit based on an end flag of the data operation circuit executing a current data operation instruction and an indication of the second indicator circuit that the data operation instruction does not depend on the data loading instruction; and/or
 the instruction reading and distribution circuit distributes a next data storage instruction to the data storage circuit based on an end flag of the data storage circuit executing a current data storage instruction and an indication of the third indicator circuit that the data storage instruction does not depend on the data operation instruction.

11. The system of claim 1, wherein the system is a neural network computing system and wherein the data for performing computation buffered in the internal buffer is feature map data and parameter data for performing neural network computation.

12. The system of claim 1, wherein the system is implemented at least in part by a GPU, an FPGA or an ASIC.

13. The system of claim 1, wherein the instruction reading and distribution circuit further includes a first in first out queue (FIFO) for buffering the read instructions, wherein the FIFO queue is not part of the internal buffer, and
 wherein the FIFO queue is configured to receive into itself the read instructions from the internal buffer so that the instruction reading and distribution circuit can distribute the read instructions to the plurality of function circuits.

14. The system of claim 1, wherein
 a first function circuit of the plurality of function circuits executes a current instruction; and
 based on at least parameter information of the current instruction and dependency information of a subsequent instruction directly depending on the current instruction, the instruction reading and distribution circuit starts the execution of the subsequent instruction using a second function circuit before the execution of the current instruction is completed.

15. The system of claim 14, wherein the instruction reading and distribution circuit is further used for:
 based on at least type information of the current instruction and the subsequent instruction, dividing the execution of the current instruction into two phases of dependency and no dependency;
 generating an end flag of the current instruction directly when the dependency phase has been completed; and
 based on at least the end flag of the current instruction, using the second function circuit to execute the subsequent instruction.

16. The system of claim 14, wherein the instruction reading and distribution circuit is further used for:
 based on at least the parameter information and the dependency information, dividing the execution of the current instruction into a plurality of phases;
 generating a phase end flag when at least one phase of the plurality of phases has been completed; and
 based on at least the phase end flag, using the second function circuit to execute the subsequent instruction.

17. The system of claim 16, wherein the instruction reading and distribution circuit is further used for:
 based on the data obtained from the at least one phase that has been completed, using the second function circuit to execute the subsequent instruction.

18. The system of claim 16, wherein a granularity size of the plurality of phases divided is determined by the instruction reading and distribution circuit based on at least a granularity size of instructions for performing neural network computation and parameters of the system for performing neural network computation.

19. The system of claim 14, wherein the plurality of function circuits include:
 a data loading circuit executing a data loading instruction that loads data for neural network computation from an external memory to the internal buffer, the data for neural network computation including parameter data and feature map data;
 a data operation circuit executing a data operation instruction that reads the parameter data and the feature map data from the internal buffer to perform an operation and stores the operational result back to the internal buffer; and
 a data storage circuit executing a data storage instruction that stores the operational result from the internal buffer back to the external memory.

20. The system of claim 19, wherein the first function circuit is the data loading circuit, the second function circuit is the data operation circuit, and in response to the data loading circuit completing loading of weight and feature map data of at least one complete operation unit, the data operation circuit starts the execution of the data operation instruction; or wherein the first function circuit is the data operation circuit, the second function circuit is the data storage circuit, and in response to the data operation circuit generating at least one operational final result and buffering the at least one operational final result to the internal buffer, the data storage circuit starts the execution of the data storage instruction to store the at least one operational final result from the internal buffer back to the external memory; or wherein the first function circuit is the data storage circuit, the second function circuit is the data loading circuit, and in response to output feature map data that the data storage circuit stores back to the external memory having no dependency relationships with input feature map data to be loaded from the external memory by the data loading instruction directly depending on a current data storage instruction, the data loading circuit is configured to start the execution of the data loading instruction after the output feature map data is written into a bus buffer zone.

21. The system of claim 14, wherein the instructions read by the instruction reading and distribution circuit include explicit dependency relationship information of the instructions with other instructions, and the instruction reading and distribution circuit uses explicit dependency relationship information in the current instruction as dependency information for the subsequent instruction directly depending on the current instruction.

* * * * *